United States Patent [19]
Doericht

[11] Patent Number: 6,030,054
[45] Date of Patent: Feb. 29, 2000

[54] BRAKE SYSTEM FOR A MOTOR VEHICLE

[75] Inventor: Michael Doericht, Lappersdorf, Germany

[73] Assignee: Siemens Aktiengesellschaft, Munich, Germany

[21] Appl. No.: 08/843,887

[22] Filed: Apr. 17, 1997

[30] Foreign Application Priority Data

Apr. 17, 1996 [DE] Germany ............ 195 15 186

[51] Int. Cl.$^7$ .................................................. B60T 13/66
[52] U.S. Cl. ............................ 303/20; 188/162; 188/72.9
[58] Field of Search ................. 188/72.1, 72.9, 188/162; 303/20

[56] References Cited

U.S. PATENT DOCUMENTS

| | | | |
|---|---|---|---|
| 3,790,225 | 2/1974 | Wehde | 188/162 |
| 4,784,244 | 11/1988 | Carre et al. | |
| 4,804,073 | 2/1989 | Taig et al. | 188/72.1 |
| 4,852,699 | 8/1989 | Karnopp et al. | 188/162 |
| 5,107,967 | 4/1992 | Fujita et al. | |
| 5,782,322 | 7/1998 | Hauck et al. | 188/162 |

FOREIGN PATENT DOCUMENTS

| | | |
|---|---|---|
| 29 54 162 | 6/1987 | Germany . |
| 4107473A1 | 9/1992 | Germany . |
| 41 38 625 | 5/1993 | Germany . |
| 195 11 287 | 1/1996 | Germany . |
| 195 11 287 A1 | 1/1996 | Germany . |
| 2 156 021 | 10/1985 | United Kingdom . |
| 97/06998 | 2/1997 | WIPO . |

OTHER PUBLICATIONS

Remling, John Brakes New York, Halliday Press, 1978 p. G–2. TL269.R45, Feb. 1978.

*Primary Examiner*—Mark T. Le
*Assistant Examiner*—Robert A. Siconolfi
*Attorney, Agent, or Firm*—Herbert L. Lerner; Laurence A. Greenberg

[57] ABSTRACT

A brake system for a motor vehicle includes an electro-mechanical wheel brake actuator mounted on brake calipers of a wheel and having a spindle driven in axial direction and an electric motor. A rotor of the electric motor is constructed as a spindle nut of a spindle gear that converts its rotary motion into a linear motion of the spindle.

4 Claims, 2 Drawing Sheets

BRAKE SYSTEM FOR A MOTOR VEHICLE

BACKGROUND OF THE INVENTION

1. Field of the Invention

The invention relates to a brake system for a motor vehicle including an actuating device constructed as an electro-mechanical wheel brake actuator mounted at a brake caliper of a wheel, the wheel brake actuator having a spindle driven in axial direction by an electric motor.

The presently ever increasing demands made of a modern brake system for motor vehicles, such as anti-lock systems, stability controls, drive slip or traction controls, necessitate wheel-selective brake interventions. So far, that has been carried out with conventional brake systems expanded with hydraulic pumps and magnetic valves, as in German Patent DE 29 54 162 C2. However, vibration problems in the hydraulic lines then arise along with difficult triggering of pressure modulation units, that is magnet valves. Due to the properties of the magnet valves, which are high-quality non-linear two-point links, the control quality with respect to the brake pressure is also limited. Such brake systems also involve considerable effort for installation in the motor vehicle: brake lines have to be laid and connected, the brake system has to be filled with brake fluid and bled, and the intactness of the system must be checked. Even during operation, there is not-inconsiderable maintenance expense, especially for the regular replenishment of brake fluid and for disposing of used brake fluid in an environmentally appropriate way.

At present, all of the known manufacturers are still equipping their vehicles with conventional brake systems. Wheel-selective brake interventions are accomplished through the use of hydraulic pumps and magnetic valves, but at the cost of the disadvantages discussed above. In order to provide a gentle buildup of brake pressure, for instance in the case of cruise control and distance-keeping devices, some manufacturers use electronically regulated vacuum brake boosters. In order to suppress the problems of vibration and the attendant noise production, proportional valves and pressure reservoirs can be used. However, the proportional valves in particular increase the price of the brake system. Additionally, they do not eliminate the disadvantages associated with the hydraulic fluid.

A brake system of that generic type, such as in German Published, Non-Prosecuted Patent Application DE 195 11 287 A1, has an electromagnetically actuated disk brake with a floating caliper and an actuation unit (or brake actuator) secured to the caliper. The brake actuator includes an electric motor, which acts through a step-down gear to axially displace a threaded spindle and thus press brake linings in pairs against a brake disk. The step-down gear is constructed as a roller thread drive in the form of a planetary gear. The rotor of the motor is secured to the threaded nut that forms the ring gear of the planetary gear. The planet wheels are constructed as elongated threaded rollers. That kind of step-down gear is complicated and expensive to produce.

SUMMARY OF THE INVENTION

It is accordingly an object of the invention to provide a brake system for a motor vehicle, which overcomes the hereinafore-mentioned disadvantages of the heretofore-known devices of this general type, which can be furnished and mounted as a prefabricated part for each wheel of the motor vehicle and which requires less effort and expense.

With the foregoing and other objects in view there is provided, in accordance with the invention, a brake system for a motor vehicle, comprising a brake caliper associated with a wheel; an actuating device constructed as an electro-mechanical wheel brake actuator mounted at the brake caliper, the wheel brake actuator having a spindle and an electric motor with a spindle nut rotor of a spindle gear converting rotary motion into linear motion driving the spindle in axial direction with an axial force; a mechanical step-up gear multiplying the axial force of the spindle; a wheel brake cylinder piston receiving the multiplied axial force from the step-up gear; brake linings acted upon by the piston; and a brake disk against which the brake linings are pressed for generating a braking moment at the brake disk.

The invention has the advantage of only requiring electrical supply and control lines to be connected to the brake actuator, which is furnished as a structural unit, on the wheel brake caliper. The brake system allows continuous regulation of the brake force at each wheel of the vehicle, ranging from basic brake function through anti-lock systems and driving stability controls and electronically regulated brake reinforcement in emergency braking. All demands of a modern brake system can be realized without additional hardware expense. Maintenance expense is reduced and environmental compatability is improved through the elimination of the hydraulic fluid.

In accordance with another feature of the invention, the electric motor has rotor magnets mounted on the spindle nut.

In accordance with a further feature of the invention, the wheel brake actuator and the spindle gear are parts of a parking brake.

In accordance with a concomitant feature of the invention, the wheel brake actuator has a housing and an electronic control device integrated into the housing.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
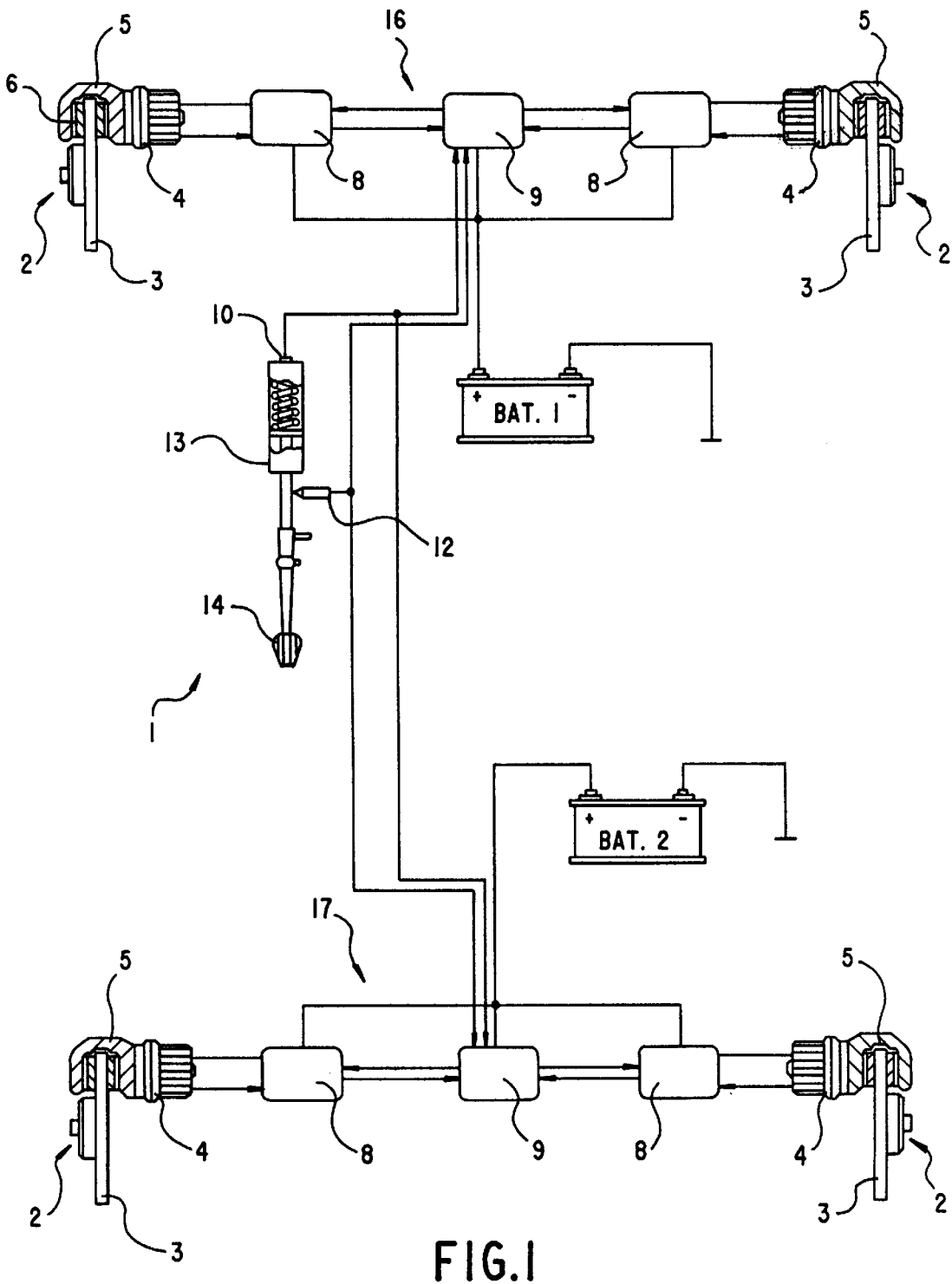
FIG. 1 is a schematic and diagrammatic, sectional view of a brake system according to the invention.

Referring now to the figures of the drawings in detail and first, particularly, to FIG. 1 thereof, there is seen a brake system 1 for a four-wheel motor vehicle (which is otherwise not shown herein) that includes four brakes 2, each of which includes one brake disk 3 and one wheel brake actuator 4 that is also referred to below as an actuator. The wheel brake actuators 4 are each integrated into one respective associated brake caliper 5, or in other words are combined with it to form a structural unit. The brake caliper 5 is constructed as a floating caliper. A braking moment is exerted on the brake disk 3 through brake linings 6 upon actuation of the wheel brake actuator 4.

Each wheel brake actuator 4 has an electronic power and control device 8, which is supplied by an associated control unit 9 with control signals, for instance for the desired moment of a wheel brake actuator motor to be described below. The electronic power and control device 8 supplies feedback variables to the control unit 9, for example with regard to an actual moment of the actuator motor.

The electronic power and control device 8 also receives feedback variables from the wheel brake actuator 4, for instance about the engine rpm or rotary angle of the engine or a contact force of the brake linings. The desired variables for each actuator are ascertained by the control unit 9 for measured variables that are furnished by various sensors, such as a force sensor 10 and a travel sensor 12, with which a pedal force simulator 13 is equipped. The pedal force simulator 13 is actuated by a brake pedal 14 of the motor vehicle. The pedal force simulator 13 converts the motion of the brake pedal 14, that is the force exerted by the driver as usual and the pedal travel, into electrical signals that are supplied to the control unit 9 and represent desired values for the brakes 2, in particular for the vehicle deceleration and for the torque or braking moment to be applied to the brake disks. In order to calculate the desired values upon an intervention of anti-lock or driving stability controls, further sensor signals, such as a transverse acceleration or yaw angle speed and wheel rpm values, are evaluated by the control unit 9.

The brake system 1 shown in FIG. 1 has two brake circuits 16 and 17, which are allocated to a front axle and a rear axle, respectively. An equally possible diagonal brake circuit allocation differs from this layout only in a different assignment of the wheel brake units to the control units and energy supply provisions. Each brake circuit 16, 17 has its own control unit 9 and its own energy supply in the form of respective batteries Bat. 1 and Bat. 2. The energy supplies and the control units may each be accommodated in one housing but must then be functionally separated from one another.

Supply lines are shown with heavy lines in FIG. 1 and are not provided with arrows. Control lines are shown as fine lines and are provided with arrows indicating the signal flow direction.

The two control units 9, which function independently of one another, may communicate with one another over a bidirectional signal line and can detect the failure of one brake circuit 16 or 17 in the other respective brake circuit and take suitable emergency measures as needed. The brake system may also be expanded with a third non-illustrated control unit which acts as a supervisor and monitors the two brake circuit control units.

Figure 2:
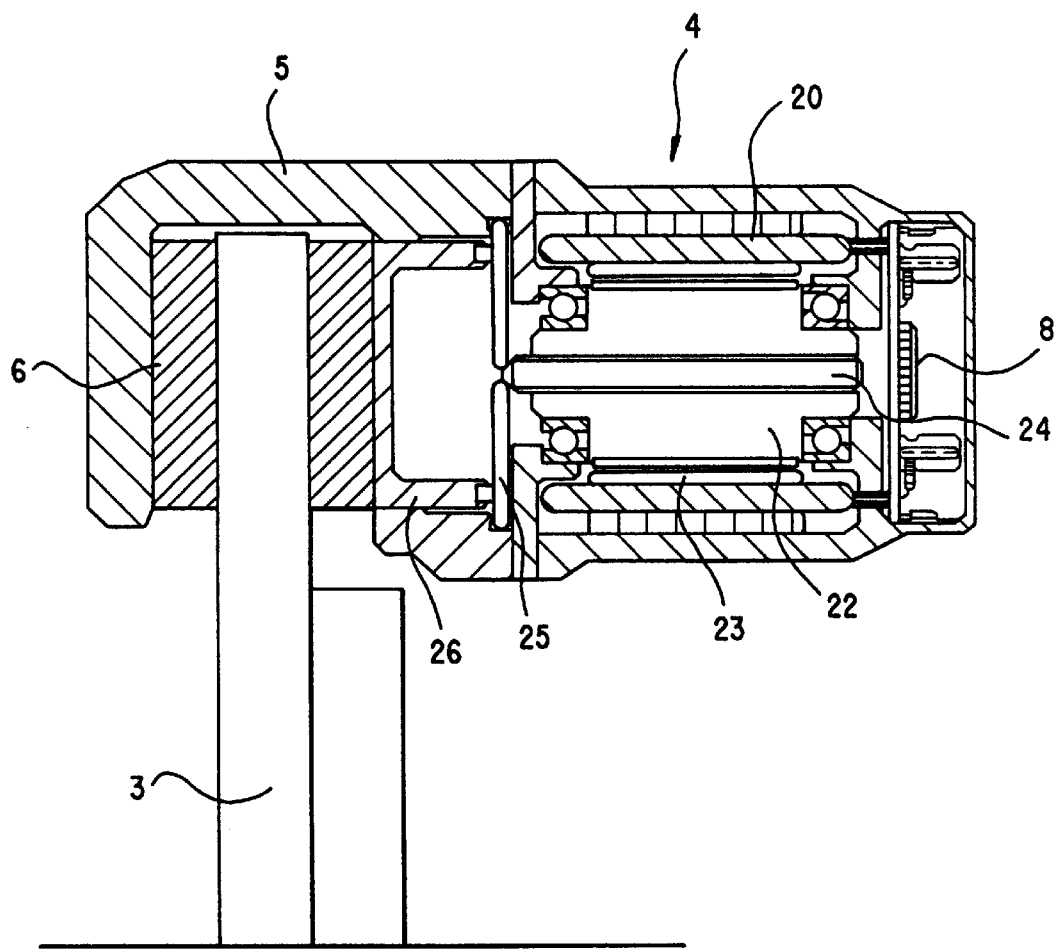
FIG. 2 is an enlarged, sectional view of a wheel brake actuator used in the brake system of FIG. 1.

The brake actuator 4 shown in FIG. 2, which as already noted is mounted directly on the brake caliper 5, is driven by a commutatorless electric motor 20. The electric motor 20 is constructed, for example, as an asynchronous motor, a synchronous motor or an electronically commutated direct current motor. In the illustrated exemplary embodiment, the electronic control device 8 for the electric motor 20 is integrated directly with the housing of the wheel brake actuator 4, but it may also be accommodated in a separate housing, at the cost of additional lines.

A rotor of the electric motor 20 is formed by a spindle nut 22 of a spindle gear which, for example, is constructed as a planetary roller gear, a ball and spindle drive, a trapezoidal thread drive, or the like. Such spindle gears are known per se (for instance, a one-piece threaded nut RGTB is made by the firm INA Lineartechnik oHG) and are therefore not shown in all of their details. A plurality of rotor magnets 23 are mounted on the spindle nut 22 of the spindle gear. The rotary motion of the rotor is converted by the spindle gear into a translational motion of a spindle 24.

The axial force of the spindle 24 is multiplied by a mechanical step-up gear 25, in the form of a lever mechanism, and transmitted to a wheel brake cylinder piston 26, which presses the brake linings 6 against the brake disk 3 and thus generates a braking moment at the brake disk.

Through the use of the wheel brake actuator 4 described above, it is possible to adjust the braking moment at the respective wheel continuously through the drive moment of the associated actuator motor 20. The vehicle manufacturer can order the entire braking apparatus for one wheel as a prefabricated part and then merely needs to connect the power supply and control lines. The electronics required for controlling the wheel brake actuator can be accommodated on the actuator itself. With the aid of the mechanical stepping up, the actuator reduces the power demands made of the engine torque as well as the structural size and weight of the wheel brake actuator.

Since hydraulic fluid is no longer needed, the maintenance expense is reduced, and the environmental compatability of the brake system 1 is improved. In German Published, Non-Prosecuted Patent Application DE 195 29 664 A1, an analogously constructed wheel brake actuator is shown, which has hydraulic stepup instead of mechanical stepup.

Fundamentally, the actuator unit including the electronic power and control device, electric motor and spindle and bearing unit, can be used regardless of the type of stepup (hydraulic or mechanical), if it is merely assured that identical step-up conditions prevail. The resultant reduction in the number of types involved lowers the costs for manufacture and the expense for keeping the brakes in stock.

Due to the friction losses of the spindle gear 22, 24 and the step-up stage 25, the spindle 24 does not automatically return to its position of repose after actuation of the wheel brake actuator but instead must be returned by supplying electrical current to the electric motor 20. This property can be exploited for a handbrake function: the actuator is actuated by the control unit until a predetermined tightening force is attained at the brake caliper, and subsequently the brake system is turned off. Due to the residual inhibition, the brake remains in the position it has reached, even if there is no electrical current to the electric motor 20. The legal requirements for the holding force of this handbrake function can be adhered to by a suitable choice of the friction parameters.

I claim:

1. A brake system for a motor vehicle, comprising:

a floating caliper associated with a wheel;

an electromechanical wheel brake actuator mounted at said caliper, said wheel brake actuator having a spindle and an electric motor with a spindle nut rotor of a spindle gear converting rotary motion into linear motion driving said spindle in axial direction with an axial force;

a mechanical step-up gear being a lever mechanism for multiplying the axial force of said spindle;

a wheel brake cylinder piston receiving the multiplied axial force from said step-up gear;

brake linings acted upon by said piston; and a brake disk against which said brake linings are pressed for generating a braking moment at said brake disk.

2. The brake system according to claim 1, wherein said electric motor has rotor magnets mounted on said spindle nut.

3. The brake system according to claim 1, wherein said wheel brake actuator and said spindle gear are parts of a parking brake.

4. The brake system according to claim 1, wherein said wheel brake actuator has a housing and an electronic control device integrated into said housing.

\* \* \* \* \*